United States Patent
Seol et al.

(10) Patent No.: US 9,237,582 B2
(45) Date of Patent: Jan. 12, 2016

(54) METHOD AND APPARATUS FOR ALLOCATING UPLINK RESOURCES IN BEAMFORMING-BASED WIRELESS COMMUNICATION SYSTEM

(71) Applicant: Samsung Electronics Co. Ltd., Suwon-si, Gyeonggi-do (KR)

(72) Inventors: Ji-Yun Seol, Seongnam-si (KR); Yeong-Moon Son, Yongin-si (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 13/759,272

(22) Filed: Feb. 5, 2013

(65) Prior Publication Data

US 2013/0201938 A1 Aug. 8, 2013

(30) Foreign Application Priority Data

Feb. 6, 2012 (KR) .................. 10-2012-0011739

(51) Int. Cl.
*H04J 1/16* (2006.01)
*H04W 72/12* (2009.01)
*H04W 72/04* (2009.01)

(52) U.S. Cl.
CPC ...... *H04W 72/1284* (2013.01); *H04W 72/0406* (2013.01); *H04W 72/042* (2013.01); *H04W 72/046* (2013.01); *H04W 72/0413* (2013.01); *H04W 72/0453* (2013.01)

(58) Field of Classification Search
CPC . H04W 16/14; H04W 72/082; H04W 72/042; H04W 72/06
USPC .......................................... 370/252; 455/509
See application file for complete search history.

(56) References Cited

U.S. PATENT DOCUMENTS

2007/0274265 A1 11/2007 Yoon et al.
2008/0139216 A1 6/2008 Lee et al.
(Continued)

FOREIGN PATENT DOCUMENTS

| KR | 10-0667696 B1 | 1/2007 |
| KR | 10-2008-0078620 A | 8/2008 |
| KR | 10-0853697 B1 | 8/2008 |
| WO | 2010/027209 A2 | 3/2010 |

OTHER PUBLICATIONS

"Uplink sounding for obtaining MIM0 channel information at Node B in E-UTRA", XP050101585, R1-060668, Feb. 9, 2006.
(Continued)

*Primary Examiner* — Mark Rinehart
*Assistant Examiner* — Matthew Hopkins
(74) *Attorney, Agent, or Firm* — Jefferson IP Law, LLP

(57) ABSTRACT

A method and an apparatus for requesting Uplink (UL) resource allocation in a beamforming-based wireless communication system are provided. A Mobile Station (MS) acquires UL beam pair information indicating a best MS transmit beam and a best Base Station (BS) receive beam for UL transmission, determines a best BS transmit beam for Downlink (DL) reception, selects a Bandwidth Request (BR) code and a BR channel from available BR codes and a designated BR transmit resource, wherein at least one of the BR code and the BR channel is mapped to at least one of the best BS receive beam and the best BS transmit beam, and transmits the selected BR code to a BS over the selected BR channel. The BS allocates a UL resource for transmission of a BR message and UL data considering the best BS receive beam.

32 Claims, 11 Drawing Sheets

(56) References Cited

U.S. PATENT DOCUMENTS

2008/0298315 A1* 12/2008 Ihm et al. ............... 370/329
2009/0322613 A1* 12/2009 Bala et al. ............... 342/373
2010/0016023 A1   1/2010 Yamauchi et al.
2011/0007721 A1   1/2011 Nasrabadi et al.
2011/0243080 A1  10/2011 Chen et al.
2011/0291891 A1* 12/2011 Nsenga et al. .......... 342/373
2012/0057558 A1*  3/2012 Prasad et al. ........... 370/329

OTHER PUBLICATIONS

"IEEE Standard for Local and metropolitan area networks Part 16: Air Interface for Broadband Wireless Access Systems; IEEE Std 802.16-2009 (Revision of IEEE Std 802.16-2004)", XP068045637, May 29, 2009.

* cited by examiner

METHOD AND APPARATUS FOR ALLOCATING UPLINK RESOURCES IN BEAMFORMING-BASED WIRELESS COMMUNICATION SYSTEM

PRIORITY

This application claims the benefit under 35 U.S.C. §119 (a) of a Korean patent application filed in the Korean Intellectual Property Office on Feb. 6, 2012 and assigned Serial No. 10-2012-0011739, the entire disclosure of which is hereby incorporated by reference.

BACKGROUND OF THE INVENTION

1. Field of the Invention

The present invention relates to a wireless communication system operating based on beamforming. More particularly, the present invention relates to a method and apparatus for transmitting and receiving a request signal for allocation of Uplink (UL) resources considering Base Station (BS) receive beams in a UL.

2. Description of the Related Art

Wireless communication systems have been developed to support a higher data rate in order to meet the continuously increasing demand for wireless data traffic. To support the increase in data rate, technologies for the wireless communication systems have evolved to mainly improve the spectral efficiency based on communication technologies such as Code Division Multiple Access (CDMA), Orthogonal Frequency Division Multiple Access (OFDMA), and Multiple Input Multiple Output (MIMO). However, the soaring demand for wireless data traffic may not be met only with the technologies for improving the spectral efficiency.

Recently, the increasing demand for smart phones and tablet computers and the explosive increase in the number of applications operating based thereon and requiring a high amount of traffic have more accelerated the demand for data traffic. One way to meet these demands is to use more frequency resources over a wider frequency band. Therefore, in order to secure a wider frequency band and apply it to wireless mobile communication, it is necessary to consider securing an ultra wideband frequency in the wider frequency band.

Wireless communication in a millimeter Wave (mmWave) band may suffer from an increase in propagation loss such as a path loss and a return loss due to the frequency characteristics of the mmWave band. As a result, the reach of radio waves may be reduced causing a decrease in coverage. On the other hand, the wavelength is very short due to the mmWave characteristics, making it easy to apply beamforming using a plurality of small antennas. Accordingly, the path loss of radio waves may be mitigated by applying beamforming technology to mmWave wireless communication, contributing to an increase in the reach of radio waves and an increase in coverage.

Transmit beamforming is a common method of increasing directivity by concentrating arrival areas of radio waves in a specific direction using a plurality of antennas. A set of the plurality of antennas is called an antenna array and each antenna included in the array is called an array element. The antenna array may be classified into a variety of types, including a linear array and a planar array. With the use of transmit beamforming, the directivity of signals may be improved contributing to an increase in transmission distance, and almost no signal may be transmitted in directions other than a desired direction, making it possible to remarkably reduce signal interference to users other than a specific user.

Meanwhile, a receiving side may also perform receive beamforming on received signals using a receive antenna array. The receive beamforming may also increase sensitivity of the signals received in a specific direction by concentrating received radio waves in a specific direction, and may block interference signals by excluding signals received in directions other than the specific direction from the received signals.

In a cellular system of the related art, best effort-based scheduling for a UL is achieved by allocating a Bandwidth Request (BR) channel in accordance with a contention-based operation through transmission of a BR ranging code, and by requesting a bandwidth over the BR channel and allocating UL resources. Specifically, such scheduling generally considers the contention due to a multiple access by multiple Mobile Stations (MSs). An MS desiring UL transmission anonymously transmits a randomly selected BR ranging code (i.e., BR code), and upon receiving the BR code, a BS allocates, to the MS, UL resources to be used to send a message such as a Bandwidth Request Header (BRH) including a Bandwidth (BW) allocation request of the MS, and then checks information about the MS from the BRH received from the MS and the requested UL resources, and allocates UL resources for data transmission.

The cellular system of the related art basically considers equi-directional or omni-directional transmission/reception of a BS and an MS. Therefore, UL and Downlink (DL) beamforming is not considered for transmission of a BR code over a BR channel, transmission/reception of UL resource allocation information for BRH transmission, and transmission of a BRH message. Therefore, there is a need for technology for efficiently performing a series of UL scheduling procedures in a beamforming-based wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for performing Uplink (UL) scheduling in a beamforming-based wireless communication system.

Another aspect of the present invention is to provide a method and apparatus for performing UL scheduling during beamforming-based UL multiple access.

Yet another aspect of the present invention is to provide a method and apparatus for applying UL and Downlink (DL) beamforming technology in a series of UL scheduling procedures.

In accordance with an aspect of the present invention, a method for requesting UL resource allocation in a beamforming-based wireless communication system is provided. The method includes acquiring UL beam pair information indicating a best Mobile Station (MS) transmit beam and a best Base Station (BS) receive beam for UL transmission, determining a best BS transmit beam for (DL reception, selecting a Bandwidth Request (BR) code and a BR channel from available BR codes and a designated BR transmit resource, wherein at least one of the BR code and the BR channel is mapped to at least one of the best BS receive beam and the best BS transmit beam, transmitting the selected BR code to a BS over the selected BR channel, receiving a resource allocation message indicating a UL resource for transmission of a BR message from the BS in response to the selected BR code, sending the BR message depending on the resource allocation message, receiving a UL burst allocation message indicating a UL resource for a UL data burst from the BS in response to the BR message, and transmitting the UL data burst depending on the UL burst allocation message.

In accordance with another aspect of the present invention, a method for allocating UL resources in a beamforming-based wireless communication system is provided. The method includes receiving a BR code from an MS over a BR channel in a predetermined BR transmit resource, acquiring information about at least one of a best BS receive beam for UL transmission of the MS and a best BS transmit beam for DL reception, from at least one of the BR code and the BR channel, sending a resource allocation message indicating a UL resource for transmission of a BR message, which are determined using the best BS receive beam, receiving from the MS the BR message that is based on the resource allocation message, sending a UL burst allocation message indicating a UL resource for a UL data burst, in response to the BR message, and receiving from the MS the UL data burst that is based on the UL burst allocation message.

In accordance with further another aspect of the present invention, an MS apparatus for requesting UL resource allocation in a beamforming-based wireless communication system is provided. The MS apparatus includes a transmitter, a receiver, and a controller for controlling the transmitter and the receiver. The controller is configured to acquire UL beam pair information indicating a best MS transmit beam and a best BS receive beam for UL transmission, to determine a best BS transmit beam for DL reception, and to select a BR code and a BR channel from available BR codes and a designated BR transmit resource, wherein at least one of the BR code and the BR channel is mapped to at least one of the best BS receive beam and the best BS transmit beam. The transmitter is configured to transmit the selected BR code to a BS over the selected BR channel. The receiver is configured to receive a resource allocation message indicating a UL resource for transmission of a BR message from the BS in response to the selected BR code. The transmitter is configured to send the BR message depending on the resource allocation message. The receiver is configured to receive a UL burst allocation message indicating a UL resource for a UL data burst from the BS in response to the BR message. The transmitter is configured to transmit the UL data burst depending on the UL burst allocation message.

In accordance with yet another aspect of the present invention, a BS apparatus for allocating UL resources in a beamforming-based wireless communication system is provided. The BS apparatus includes a transmitter, a receiver, and a controller for controlling the transmitter and the receiver. The receiver is configured to receive a BR code from an MS over a BR channel in a predetermined BR transmit resource. The controller is configured to acquire information about at least one of a best BS receive beam for UL transmission of the MS and a best BS transmit beam for DL reception, from at least one of the BR code and the BR channel. The transmitter is configured to send a resource allocation message indicating a UL resource for transmission of a BR message, which are determined using the best BS receive beam. The receiver is configured to receive from the MS the BR message that is based on the resource allocation message. The transmitter is configured to send a UL burst allocation message indicating a UL resource for a UL data burst, in response to the BR message. The receiver is configured to receive from the MS the UL data burst that is based on the UL burst allocation message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a millimeter Wave (mmWave) wireless communication system operating based on beamforming, the beams are formed for maximization of beam gain in a Downlink (DL) and an Uplink (UL) to overcome the significant propagation loss and penetration loss which occur due to the mmWave channel propagation characteristics. Beamforming in the DL is achieved based on a beam pair including a Base Station's (BS's) transmit beamforming and a Mobile Station's (MS's) receive beamforming, and includes a process of selecting a best beam pair from one or more BS transmit beams and MS receive beams which occur in several directions depending on the structure of each of the MS and the BS, and allowing both the MS and the BS to recognize information about the best beam pair. Similarly, beamforming in the UL is achieved based on a beam pair including an MS's transmit beamforming and a BS's receive beamforming, and information about a best beam pair of one or more MS transmit beams and BS receive beams which occur in several directions depending on the structure of each of the MS and the BS is shared between the BS and the MS.

Figure 1:
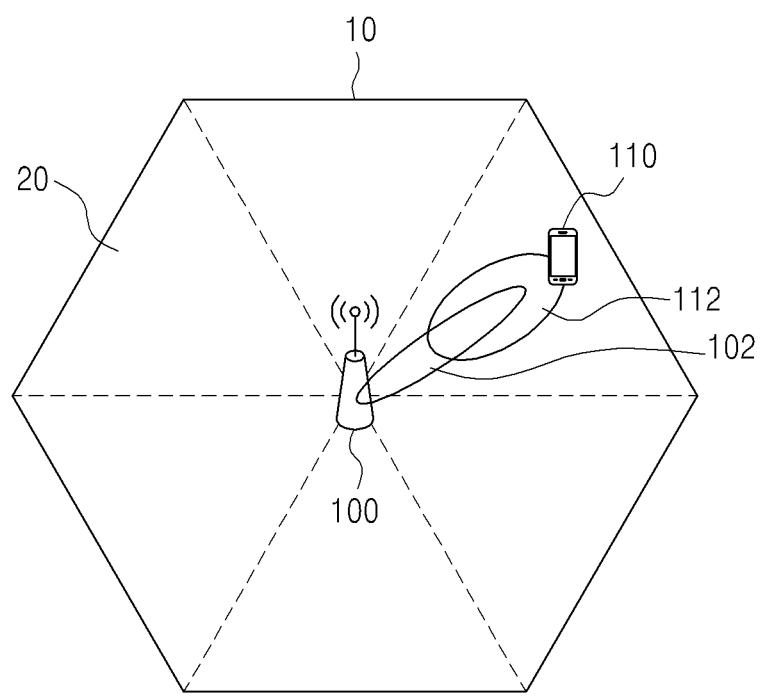
FIG. 1 illustrates a beamforming-based signal transmission/reception scenario according to an exemplary embodiment of the present invention.

FIG. 1 illustrates a beamforming-based signal transmission/reception scenario according to an exemplary embodiment of the present invention.

Referring to FIG. 1, a BS 100 has one cell 10 and a service area consisting of one or more sectors 20 corresponding to the cell 10. The number of sectors 20 belonging to one cell 10 may be one or more. It will be assumed herein that multiple beams are operated in each sector 20. In order to support one or more MSs while acquiring beamforming gain, the BS 100 simultaneously forms one or more transmit/receive beams (e.g., 102, 112) for DL/UL in different directions, or sequentially forms one or more transmit/receive beams while sweeping them in different directions. As an example, the BS 100 simultaneously forms N receive beams facing in N directions for N slots. As another example, the BS 100 sequentially forms N receive beams facing N directions while sweeping them for N slots. More specifically, a first receive beam is formed only in a first slot, a second receive beam is formed only in a second slot, an i-th receive beam is formed only in an i-th slot, and an N-th receive beam is formed only in an N-slot.

Due to its structural constraints, an MS 110 generally operates in a wide beam width supporting low beam gain, compared with the BS 100. Depending on its implementation, the MS 110 may support one or more transmit/receive beams for DL/UL.

Figure 2:
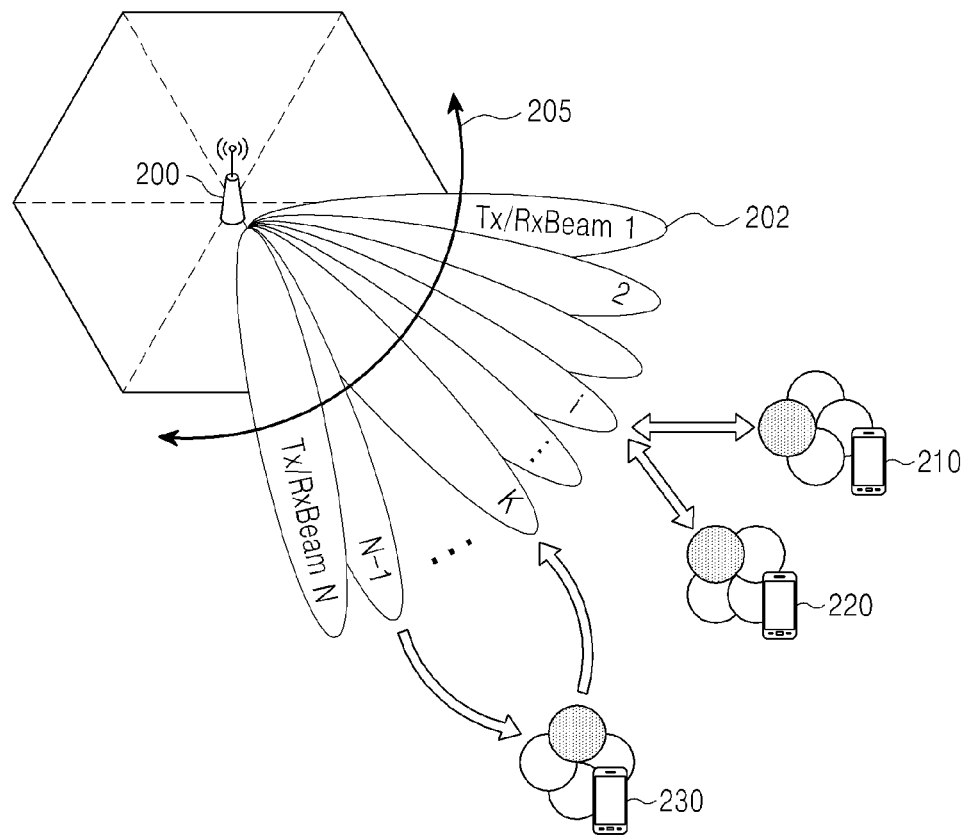
FIG. 2 illustrates beamforming-based communication between a Base Station (BS) and Mobile Stations (MSs) according to an exemplary embodiment of the present invention.

FIG. 2 illustrates beamforming-based communication between a BS and MSs according to an exemplary embodiment of the present invention.

Referring to FIG. 2, a BS 200 operates a plurality of transmit/receive beams 202 facing different directions for DL/UL in one sector, and MSs 210, 220 and 230 each support one or more transmit/receive beams. The BS 200 may simultaneously receive/transmit a plurality of beam-formed signals (i.e., receive/transmit beams) in different directions, or may receive/transmit a plurality of signals through receive/transmit beams by sequentially sweeping 205 one or more beams facing different directions.

Depending on the implementation for securing the maximum possible beamforming gain under the constraints that are based on the shape and complexity of the MSs 210, 220 and 230, the MSs 210, 220 and 230 may support omnidirectional transmission/reception without supporting transmit/receive beamforming, may support only one specific beamforming pattern at a time while supporting transmit/receive beamforming, or may simultaneously apply a plurality of transmit/receive beamforming patterns in different directions while supporting transmit/receive beamforming.

For an MS (not shown) not supporting transmit beamforming, the BS 200 measures channel quality of a reference signal for each transmit beam of the MS, and selects a best beam optimal to the MS among a plurality of receive beams of the BS 200 based on the measurement results. In the case of the MSs 210, 220 and 230 supporting transmit beamforming, the BS 200 measures channel quality of each pair that is based on a plurality of receive beams of the BS 200 for each transmit beam pattern of the MSs 210, 220 and 230, selects and manages the best one, some of, or all pairs of the BS receive beams and the MS transmit beams in the BS 200, and schedules an appropriate beam pair to the MSs 210, 220 and 230 depending on the circumstance.

Under multiple access where a plurality of MSs 210, 220 and 230 access the BS 200, Uplink Ranging (UL RNG) or Random Access Channel (RACH) may be used as a reference signal for measuring channel quality of each UL beam pair for the multiple MSs 210, 220 and 230. This is because the UL RNG or RACH uses a code or sequence randomly selected from several codes, and is operated based on the contention between multiple MSs.

A random code or sequence for UL RNG or RACH is designed considering UL multiple access of multiple MSs, and the BS 200 has the anonymous characteristics that the BS 200 cannot directly determine from which MS the detected code or sequence is transmitted. However, unlike in the existing wireless communication system, when the random code or sequence for UL RNG or RACH is used as a reference signal for a UL beamforming operation, a different code (or sequence) may be mapped to each UL beam of the MSs 210, 220 and 230, making it possible to distinguish one or more UL beams of the MSs 210, 220 and 230, which are transmitted sequentially or simultaneously, or the code (or sequence) may be transmitted together with a beam ID being carried on each UL beam.

In a DL, each of the MSs 210, 220 and 230 may select a best transmit beam of the BS 200 by performing channel measurement for each transmit beam of the BS 200 from the reference signal transmitted through each transmit beam of the BS 200. When operating receive beamforming where each of the MSs 210, 220 and 230 uses one or more receive beams, the MSs 210, 220 and 230 may select a best pair for BS transmit beams and MS receive beams in a DL by performing channel measurement based on MS receive beams for each transmit beam of the BS 200.

Figure 3:
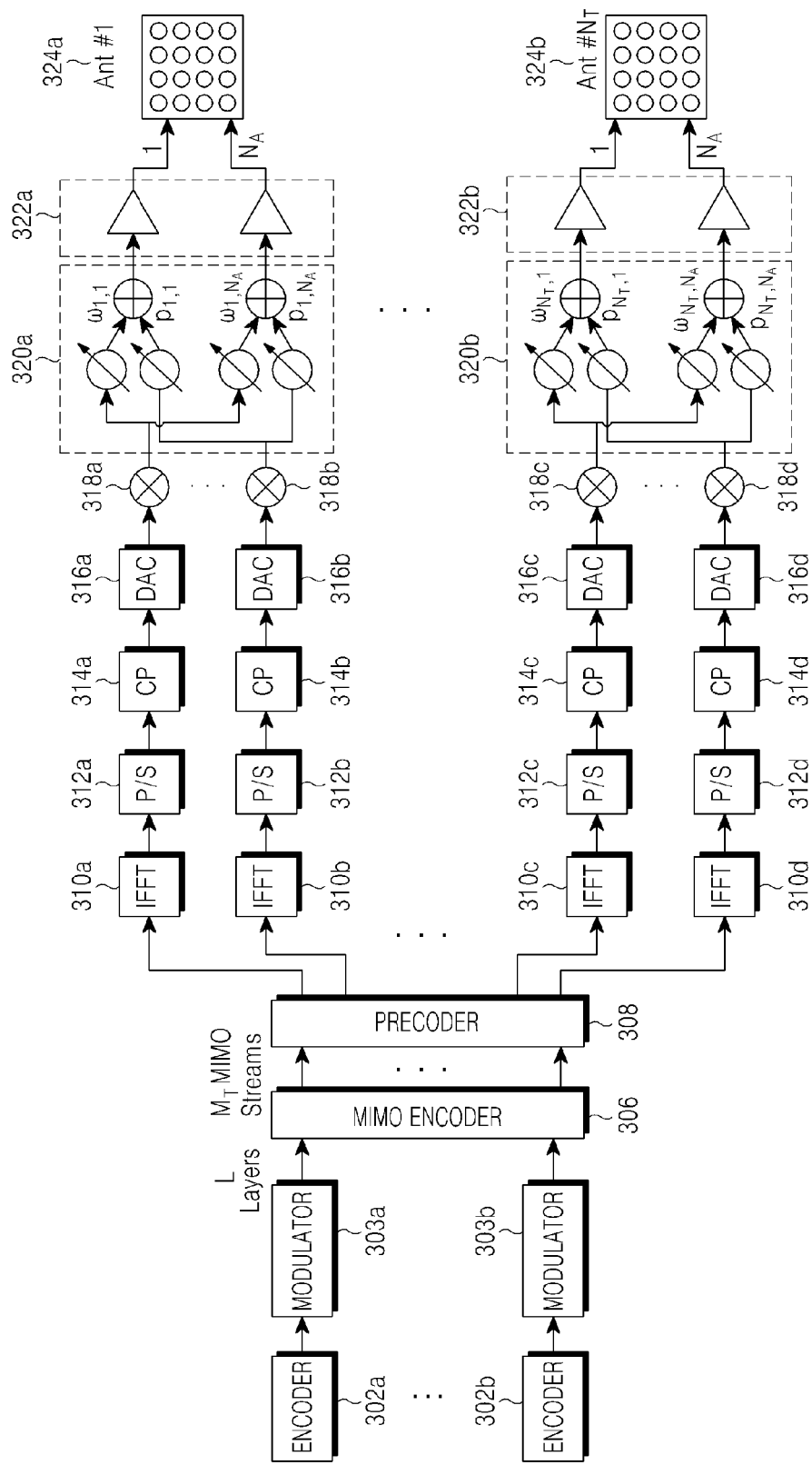
FIG. 3 is a block diagram illustrating a transmitter's physical layer for supporting beamforming according to an exemplary embodiment of the present invention.

FIG. 3 is a block diagram illustrating a transmitter's physical (PHY) layer for supporting beamforming according to an exemplary embodiment of the present invention. Herein, a hybrid structure that simultaneously applies analog beamforming and digital beamforming is shown as an example to represent a general beamforming support structure.

Referring to FIG. 3, a plurality of encoders 302a and 302b encode input information corresponding to L layers, and a plurality of modulators 303a and 303b map the coded information to modulation symbols. A MIMO encoder 306 converts modulation symbol sequences corresponding to L layers into $M_T$ MIMO streams, and a precoder 308 converts $M_T$ MIMO streams into $N_T \times N_A$ pre-coded streams corresponding to $N_T$ antenna arrays 324a and 324b and $N_A$ antenna elements included in each antenna array, using a predetermined pre-coding matrix.

The pre-coded streams are converted into analog signals through Inverse Fast Fourier Transform (IFFT) units 310a, 310b, 310c and 310d, Parallel to Serial Converters (P/Ss) 312a, 312b, 312c and 312d, Cyclic Prefix (CP) inserters 314a, 314b, 314c and 314d, Digital to Analog Converters (DACs) 316a, 316b, 316c and 316d, and mixers 318a, 318b, 318c and 318d, and then input to phase shifters 320a and 320b, and power amplifiers 322a and 322b.

The phase shifters 320a and 320b control phases Ω and p corresponding to $N_T$ antenna arrays 324a and 324b and $N_A$ antenna elements for the input analog signals, and the power amplifiers 322a and 322b control amplitudes corresponding to $N_T$ antenna arrays 324a and 324b and $N_A$ antenna elements for the phase-shifted signals. The analog signals are formed of transmit beams having specific powers in specific directions by the phase shifters 320a and 320b and the power amplifiers 322a and 322b. The shown transmitter structure may secure additional beamforming gain by a Radio Frequency (RF) path which includes IFFT units before DAC, the MIMO encoder 306 and the precoder 308, and may support functions such as multi-user operation, frequency-selective allocation, and multi-beam forming.

A description will now be made of an exemplary flow for requesting UL resource allocation for UL data transmission to a BS by an MS in a situation where an MS supporting one or more transmit beams selects a best transmit/receive beam pair for a UL and performs beam tracking by regularly performing beam sweeping-based UL synchronization with a BS that operates based on beamforming through a plurality of receive beams.

Figure 4:
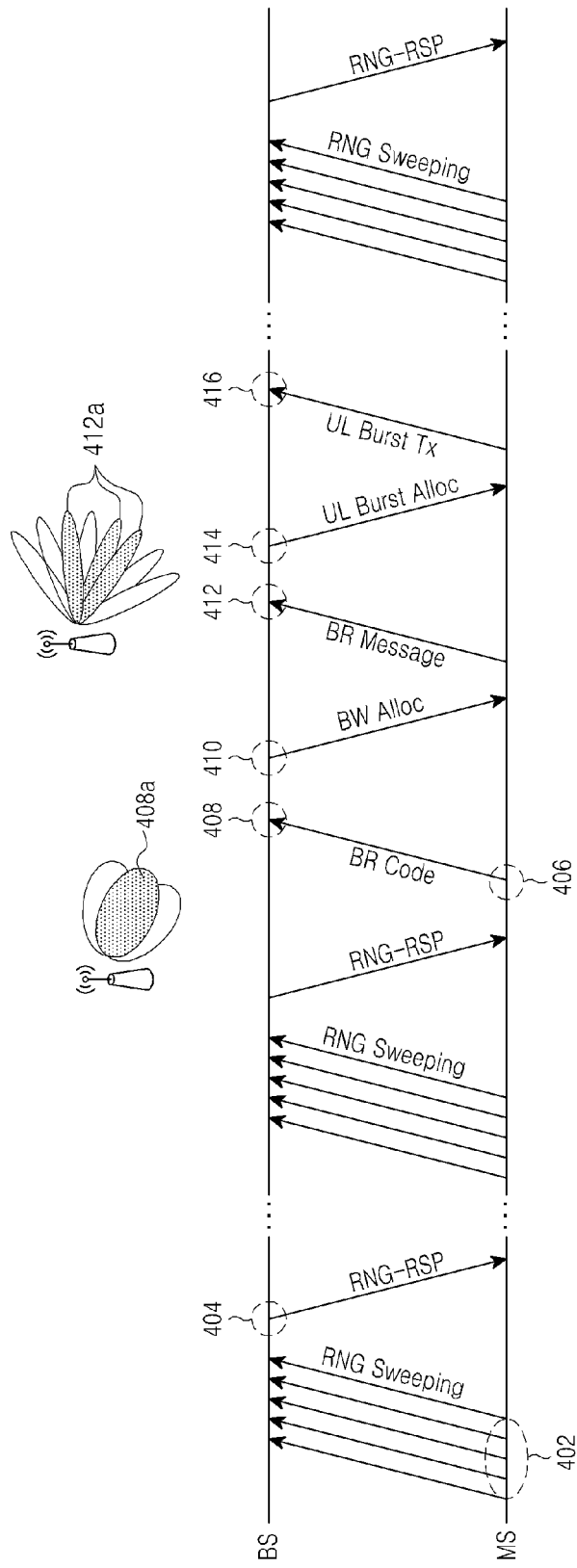
FIG. 4 is a message flow diagram illustrating an Uplink (UL) scheduling procedure according to an exemplary embodiment of the present invention.

FIG. 4 is a message flow diagram illustrating a UL scheduling procedure according to an exemplary embodiment of the present invention.

Referring to FIG. 4, an MS supporting one or more transmit beams may support UL beam tracking during its entry into a network for connecting with a BS, after handover, or through a ranging process that is triggered periodically or aperiodically in a connected state. More specifically, in step 402, the MS transmits a reference signal through each MS transmit beam while sweeping MS transmit beams so that the BS may perform channel measurement and select a best beam pair according to a plurality of beam pairs which are based on the number, K, of MS transmit beams and the number, N, of BS receive beams. The BS receives reference signals transmitted through transmit beams from the MS, while sweeping BS receive beams for each MS transmit beam.

In step 404, the BS measures channel quality for each pair of BS receive beams and MS transmit beams using the reference signals transmitted from the MS, selects one or more best beam pairs based on the measurement results, and delivers UL beam pair information indicating the selected M best beam pairs (where M is an integer greater than zero (0)) to the MS, using a DL message such as a Ranging Response (RNG-RSP) message. For example, the UL beam pair information may include an MS transmit beam identifier and a BS receive beam identifier for each best beam pair.

Although it will not be shown, for DL beam tracking, an MS performs channel measurement on pairs of BS transmit beams and MS receive beams by scanning a DL reference signal for each BS transmit beam, which is periodically transmitted at intervals of a period such as a multiple of each frame or subframe, determines a best beam pair for the DL depending on the measurement results, and tracks and manages information about the best BS transmit beam. As a possible option, the DL beam tracking may be performed during the network entry, may be performed after handover, or may be performed periodically or aperiodically in a connected state.

The UL beam tracking procedure and DL beam tracking procedure may be performed independently, and an MS continuously updates and stores UL beam pair information indicating best MS transmit beams and best BS receive beams, and best DL BS transmit beam information.

In step 406, the MS may trigger the UL resource allocation request procedure if there is a need for UL data transmission in a situation where there is no allocated UL resource. If the UL resource allocation request procedure is triggered, the MS selects a Bandwidth Request (BR) code and a BR channel indicating information about a best BS receive beam, and transmits the BR code over the BR channel. The BR codes may be, for example, ranging codes or random sequences determined for UL RNG or RACH. The BR code may be transmitted using the best MS transmit beam that is determined through the UL beam tracking procedure of steps 402 and 404.

In step 408, the BS receives a BR code for an anonymous MS. As a possible option, the BS receives a BR code using a receive beam 408a which is wider than a data channel in terms of the beam width, considering the higher robustness of a UL control channel such as a BR channel, compared to the data channel. More specifically, the BR code of the MS may be received at the BS through the wider BS receive beam 408a. By receiving the BR code, the BS acquires information about the best BS receive beam for the anonymous MS.

In step 410, the BS allocates a UL resource for a BR message to be sent by the MS considering the best BS receive beam, and sends a resource allocation message (for example, a UL MAP message or a Code Division Multiple Access (CDMA) allocation message) indicating the allocated UL resource, to the MS.

In step 412, the MS sends a BR message to the BS using the UL resources allocated by the resource allocation message received in step 410. The BR message is sent through the best MS transmit beam that is acquired through the UL beam tracking procedure. The BS may receive the BR message through the best BS receive beam 412a of the MS, which is recognized by receiving the BR code in step 408.

In step 414, the BS allocates a UL resource for transmission of UL data bursts considering the best BS receive beams 412a, and sends a UL burst allocation message (for example, a UL MAP message) indicating the allocated UL resources, to the MS. In step 416, the MS transmits UL data bursts to the BS using UL resources allocated by the UL burst allocation message. The UL data bursts are transmitted through the best MS transmit beams acquired through the UL beam tracking procedure. In addition, the BS may receive the UL data bursts through the best BS receive beams 412a of the MS, which are recognized by receiving the BR code in step 408.

The BR code that the MS transmits may indicate a best BS receive beam in a variety of ways. As an example, BR codes that an MS can transmit are subdivided into a plurality of code sets, which correspond to one or more BS receive beams, respectively, and the MS selects an arbitrary BR code to transmit in the code set that is mapped to a best BS receive beam acquired through the UL beam tracking procedure.

Figure 5:
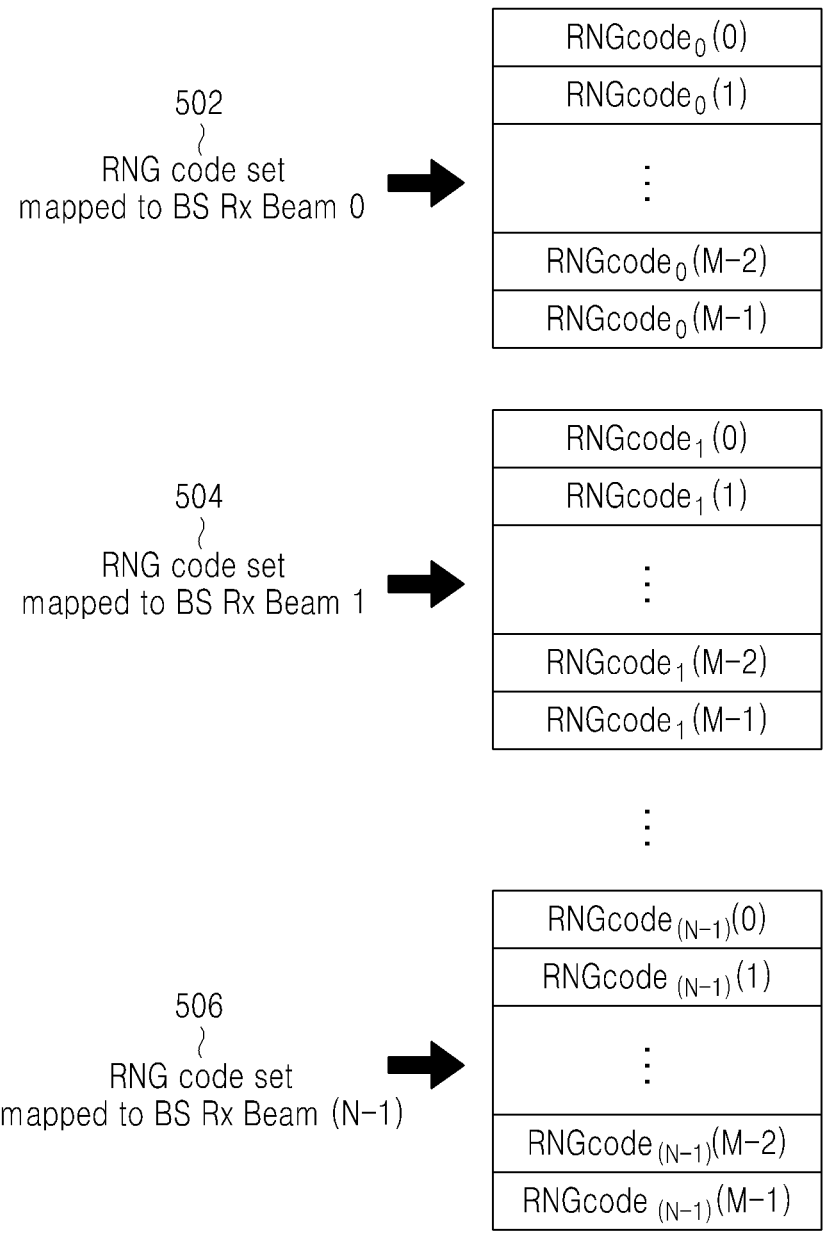
FIG. 5 illustrates Bandwidth Request (BR) code sets mapped to BS receive beams according to an exemplary embodiment of the present invention.

FIG. 5 illustrates BR code sets mapped to BS receive beams according to an exemplary embodiment of the present invention. Herein, ranging codes are shown as an example of BR codes.

Referring to FIG. 5, a first ranging code set 502 is mapped to a BS receive beam #0, and includes RNGcode0(0), RNGcode0(1), . . . , RNGcode0(M-2), RNGcode0(M-1). A second ranging code set 504 is mapped to a BS receive beam #1, and includes RNGcode1(0), RNGcode1(1), . . . , RNGcode1(M-2), RNGcode1(M-1). An N-th ranging code set 506 is mapped to a BS receive beam #(N-1), and includes RNGcode(N-1)(0), RNGcode(N-1)(1), . . . , RNGcode(N-1)(M-2), RNGcode(N-1)(M-1). As another example, at least some ranging code sets may be mapped to one or more BS receive beams, making it possible to indicate one or more best BS receive beams. Although it is assumed herein that all code sets include the same number, M, of ranging codes, the code sets may include different numbers, Mn, of ranging codes as another example.

Setting of BR code sets may be flexibly changed depending on the operation of the BS. Information about the BR code sets of a BS may be signaled from the BS to MSs in its cell in a broadcast or unicast manner.

Upon receiving a BR code from an anonymous MS, a BS determines a BS receive beam identifier uniquely corresponding to a code set identifier, from the code set identifier indicating a code set in which the BR code is included, and recognizes that the anonymous MS has a BS receive beam with the determined identifier as a best BS receive beam.

As another example, an MS selects one BR code in a BR code set that is configured regardless of BS receive beams, and transmits it over a BR channel (for example, a BR Ranging Channel (BR RNGCH)), and the MS encodes information indicating a best BS receive beam within the selected BR code, and transmits it together with the BR code.

As another example, BR channels (for example, BR RNGCHs) used for transmission of BR codes are mapped to BS receive beams, and a BR code selected by an MS is transmitted over a BR channel mapped to a best BS receive beam acquired through the UL beam tracking procedure. The BS may recognize the best BS receive beam based on the BR channel over which the BR code is received.

Figure 6:
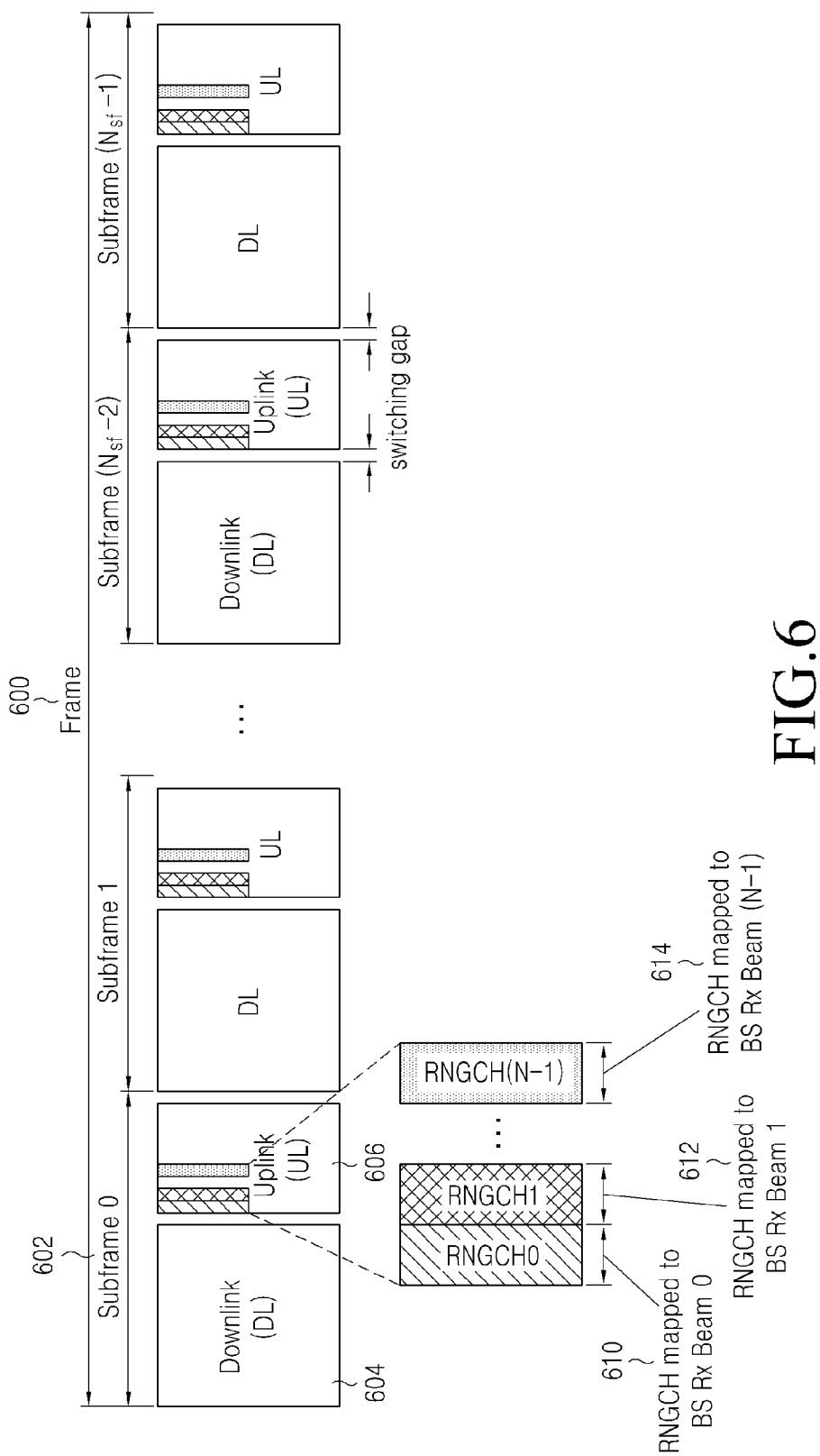
FIG. 6 illustrates a frame structure including BR channels mapped to BS receive beams according to an exemplary embodiment of the present invention.

FIG. 6 illustrates a frame structure including BR channels mapped to BS receive beams according to an exemplary embodiment of the present invention. Although an example of a Time Division Duplex (TDD) frame structure will be considered herein by way of example, the frame structure may have a variety of formats depending on the duplex mode (i.e., TDD, Frequency Division Duplex (FDD) or Half-duplex FDD (H-FDD)), the maximum number of MS transmit beams and BS receive beams, the form of a reference signal for each beam, and the transmission cycle of the reference signal.

Referring to FIG. 6, a frame 600 is comprised of Nsf subframes 602, and each subframe 602 includes a DL interval 604 and a UL interval 606, which are separated by a switching gap. Predetermined BR resource areas 610, 612 and 614 in each UL interval 606 are allocated to transmit RNGCH or RACH. MSs desiring to request a UL bandwidth may transmit BR codes based on the contention using the BR resource areas 610, 612 and 614.

The BR resource areas 610, 612 and 614 allocated to the UL interval 606 are divided into a plurality of channel regions, and each channel region is mapped to a BS receive beam that a BS may use for UL reception. Specifically, a first channel region RNGCH0 610 is mapped to a BS receive beam #0, a second channel region RNGCH1 612 is mapped to a BS receive beam #1, and an N-th channel region RNGCH(N-1) 614 is mapped to a BS receive beam #(N-1). As another example, at least some channel regions may be mapped to one or more BS receive beams, making it possible to indicate one or more best BS receive beams.

Upon receiving a BR code from an anonymous MS over a specific BR channel, a BS determines a BS receive beam identifier uniquely corresponding to a channel region identifier, from the channel region identifier indicating a channel region to which the BR channel belongs, and recognizes that the anonymous MS has a BS receive beam with the determined identifier as a best BS receive beam.

In this way, an MS may directly/explicitly or indirectly/implicitly inform a BS of a best BS receive beam that the BS will use in receiving a BR message and/or a UL burst, during transmission of a BR code. The BS may check and identify a best BS receive beam of the MS from the BR code.

As a possible option, a BS may operate multiple BR channels, i.e., BR RNGCHs, which are mapped to BS transmit beams used for DL transmission. Based on best BS transmit beam information obtained through the DL beam tracking procedure, an MS transmits a BR code (or BR RNG code) over a BR channel (or BR RNGCH) mapped to a best BS transmit beam during UL resource request. By receiving a BR code from an anonymous MS over a specific BR channel, the BS determines and identifies a best BS transmit beam of the MS, which is uniquely mapped to the specific BR channel, and uses the best BS transmit beam during transmission of DL data bursts to the MS.

Figure 7:
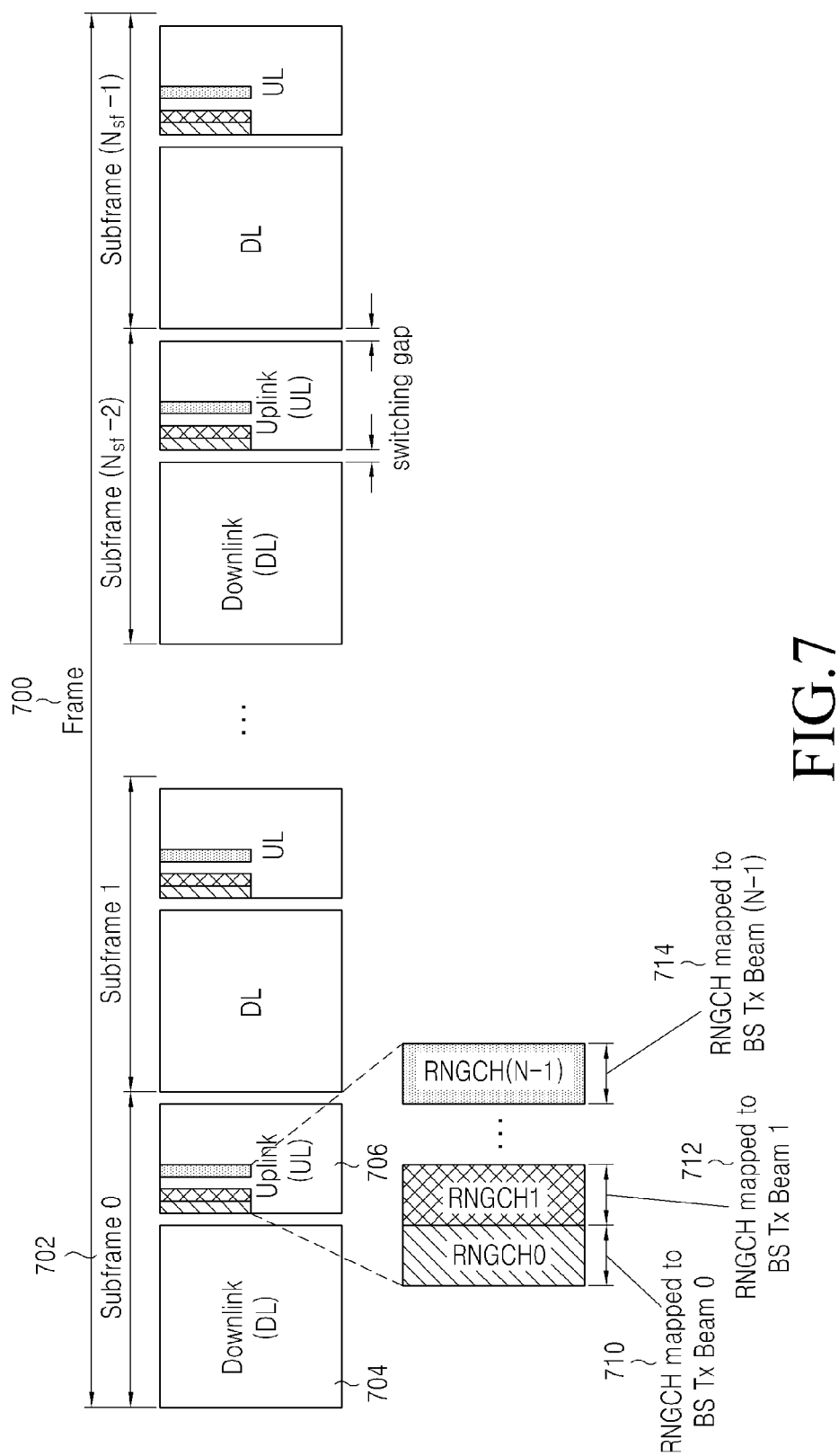
FIG. 7 illustrates a frame structure including BR channels mapped to BS transmit beams according to an exemplary embodiment of the present invention.

FIG. 7 illustrates a frame structure including BR channels mapped to BS transmit beams according to an exemplary embodiment of the present invention.

Referring to FIG. 7, a frame 700 is comprised of Nsf subframes 702, and each subframe 702 includes a DL interval 704 and a UL interval 706, which are separated by a switching gap. Predetermined BR resource areas 710, 712 and 714 in each UL interval 706 are allocated to transmit RNGCH or RACH. MSs desiring to request a UL bandwidth may transmit BR codes based on the contention using the BR resource areas 710, 712 and 714.

The BR resource areas 710, 712 and 714 allocated to the UL interval 706 are divided into a plurality of channel regions, and each channel region is mapped to a BS transmit beam that a BS may use for UL reception. Specifically, a first channel region RNGCH0 710 is mapped to a BS transmit beam #0, a second channel region RNGCH1 712 is mapped to a BS transmit beam #1, and an N-th channel region RNGCH(N-1) 714 is mapped to a BS transmit beam #(N-1). As another example, at least some channel regions may be mapped to one or more BS transmit beams, making it possible to indicate one or more best BS transmit beams.

Only one or both of the methods illustrated in FIGS. 6 and 7 may be applied. As an example, the UL intervals 606 and 706 may be comprised of channel regions corresponding to each pair of BS receive beams and BS transmit beams. As another example, the UL intervals 606 and 706 may individually include channel regions corresponding to BS receive beams and channel regions corresponding to BS transmit beams.

As another example, during transmission of a BR code, an MS may encode information about a best BS transmit beam of a DL in the BR code and transmit it together with the BR code. As another example, an MS selects and transmits a BR code mapped to a best BS transmit beam among a plurality of BR codes, and a BS may identify a best BS transmit beam optimal to the MS from the received BR code.

A BS acquires information about a best BS transmit beam by receiving a BR code, and may use the best BS transmit beam for transmission of a resource allocation message in step 410 and/or a UL burst allocation message in step 414 for UL resource allocation in the UL resource allocation request procedure of FIG. 4.

Figure 8A:
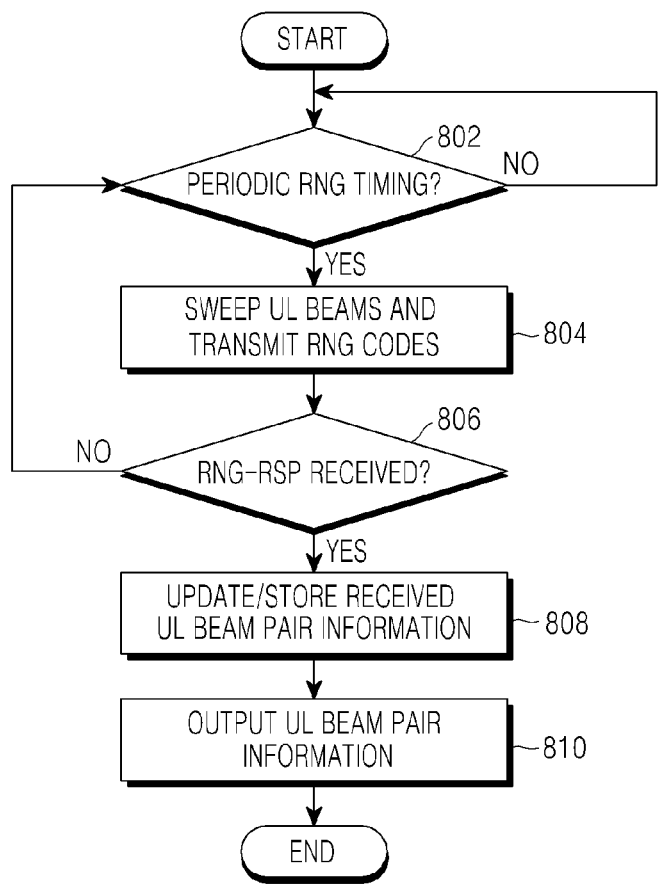
FIGS. 8A to 8C are flowcharts illustrating an operation of requesting UL resource allocation by an MS according to an exemplary embodiment of the present invention.
Figure 8B:
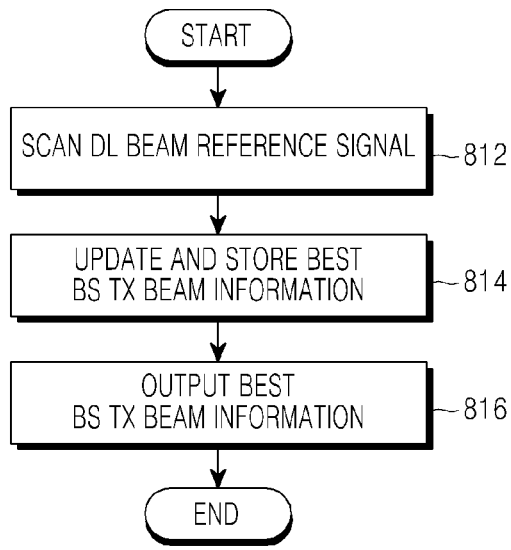
Figure 8C:
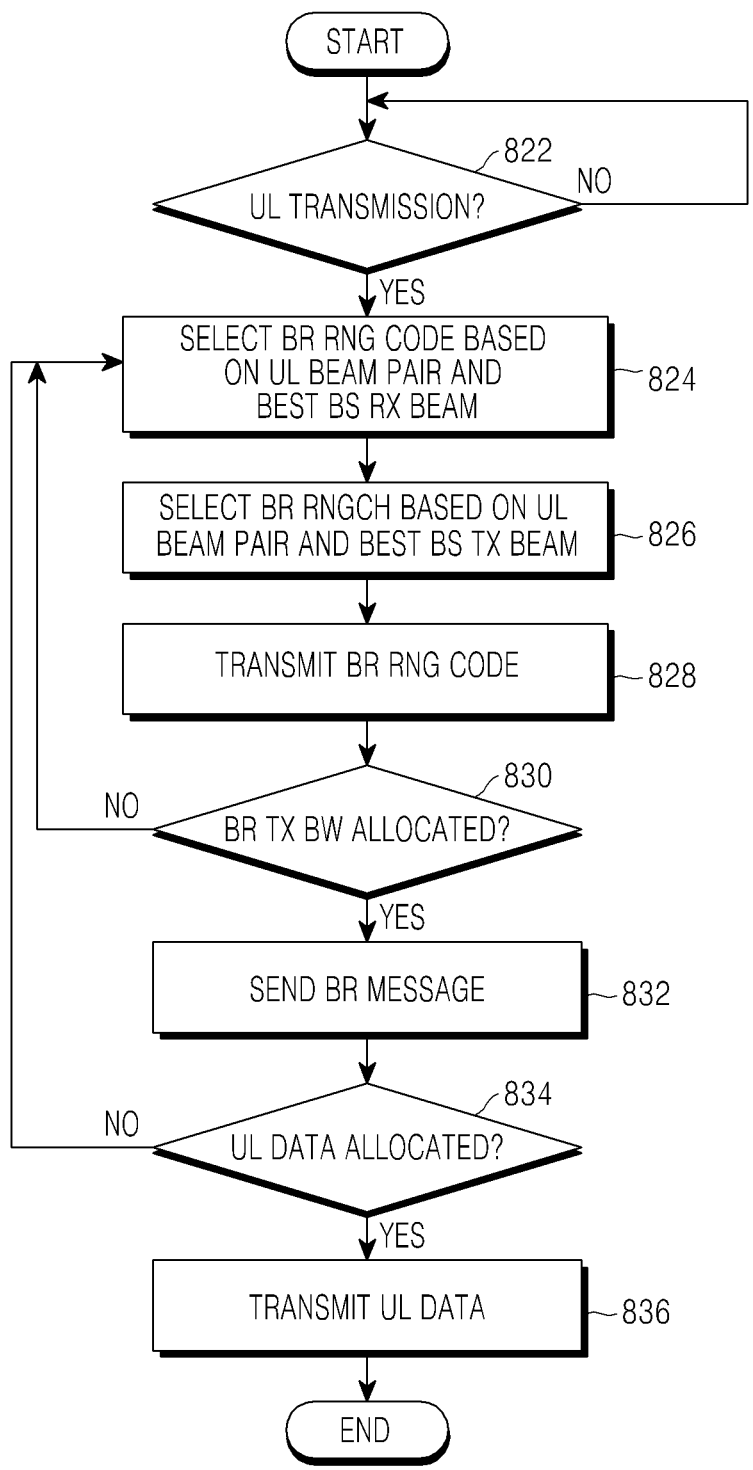

FIGS. 8A to 8C are flowcharts illustrating an operation of requesting UL resource allocation by an MS according to an exemplary embodiment of the present invention.

Referring to FIG. 8A, the MS determines in step 802 whether periodic RNG timing has come. If the periodic RNG timing has come, the MS performs UL beam tracking in step 804. Although it is assumed herein that the ranging procedure for UL beam tracking is periodically performed, the UL beam tracking may be performed periodically or aperiodically depending on the predetermined cycle or the predetermined conditions. An example of the predetermined conditions may include at least one of the network entry and the execution of handover.

Also in step 804, the MS transmits a reference signal, for example, a ranging code, through each MS transmit beam while sweeping MS transmit beams over the designated UL resource areas. A BS receives reference signals transmitted through the MS transmit beams, through its BS receive beams, and determines one or more best beam pairs by measuring a channel state for each beam pair.

In step 806, the MS determines whether a response message (for example, an RNG-RSP message) to the transmitted ranging code is received. Upon failure to receive the response message within a predetermined time, the MS returns to step 802. However, upon receiving the response message within the predetermined time, the MS proceeds to step 808.

In step 808, the MS receives, from the BS, UL beam pair information indicating the one or more best beam pairs selected by the BS, and stores the received UL beam pair information, or updates old UL beam pair information if there is the old UL beam pair information that is already stored. In step 810, the MS reads/outputs the stored UL beam pair information if it is required for UL resource allocation request.

Referring to FIG. 8B, in step 812, the MS scans DL reference signals received through MS receive beams periodically or aperiodically depending on the predetermined cycle or the predetermined conditions. The MS scans DL reference signals for each BS transmit beam individually, and measures channel states for pairs with the MS receive beams. In step 814, the MS determines a best BS transmit beam depending on the channel measurement results, and stores information about the best BS transmit beam, or updates old best BS transmit beam information if there is the old best BS transmit beam information that is stored already. In step 816, the MS reads/outputs the stored best BS transmit beam information if it is required for UL resource allocation request.

Although FIG. 8C will show an MS's operation in which BR codes are mapped to BS receive beams and BR channels are mapped to BS transmit beams by way of example, the present invention is not limited thereto. As described above, at least one of the BR code and the BR channel may uniquely identify at least one of the BS receive beam and the BS transmit beam.

Referring to FIG. 8C, the MS determines in step 822 whether there is a need for transmission of UL data. If there is a need for transmission of UL data, the MS selects a BR code (i.e., BR RNG code) in step 824 based on the UL beam pair information and/or best BS receive beam information read out in steps 810 and 816. As an example, the MS selects one BR code in a BR code set mapped to a best BS receive beam that is based on the UL beam pair information, among the BR code sets configured as shown in FIG. 5.

In step 826, the MS selects a BR channel for carrying the selected BR code, based on the UL beam pair information and best BS transmit beam information read out in steps 810 and 816. In an exemplary implementation, the MS selects a BR channel mapped to best BS transmit beam according to the best BS transmit beam that is based on the UL beam pair information in the frame structure configured as shown in FIG. 6 or 7. In another exemplary implementation, the MS may select a BR code mapped to a best BS transmit beam in step 824, and select a BR channel mapped to a best BS receive beam in step 826. Thus, the MS may notify the BS of both the best BS receive beam and the best BS transmit beam by transmitting the BR code.

In step 828, the MS transmits the BR code selected in step 824 over the BR channel selected in step 826. The selected BR code may be transmitted through the best MS transmit beam indicated by the UL beam pair information.

In step 830, the MS determines whether a resource allocation message indicating a UL resource for transmission of a BR message is received from the BS. The resource allocation message may be sent through a best BS transmit beam indicated by the BR code transmitted in step 828. If the resource allocation message is not received within a predetermined time, the MS returns to step 824. However, upon receiving the resource allocation message, the MS sends a BR message using the UL resource indicated by the resource allocation message in step 832. As an example, the BR message may be sent using best MS transmit beams indicated by the UL beam pair information.

In step 834, the MS determines whether a UL burst allocation message indicating a UL resource for transmission of UL data bursts is received from the BS. The UL burst allocation message may be sent through the best BS transmit beam indicated by the BR code transmitted in step 828. If the UL burst allocation message is not received within a predetermined time, the MS returns to step 824. However, upon receiving the UL burst allocation message, the MS transmits a UL data burst using the UL resource indicated by the UL burst allocation message in step 836. As an example, the UL data burst may be transmitted through the best MS transmit beam indicated by the UL beam pair information.

Figure 9:
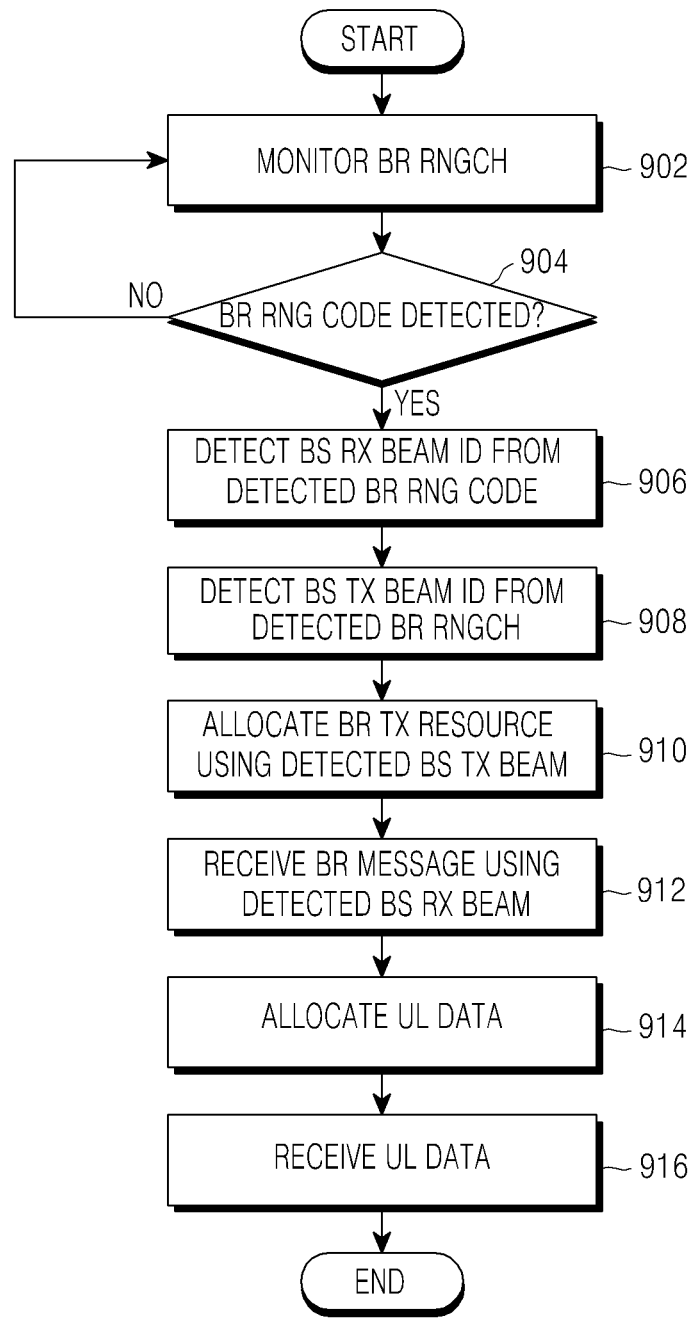
FIG. 9 is a flowchart illustrating an operation of allocating UL resources by a BS according to an exemplary embodiment of the present invention.

FIG. 9 is a flowchart illustrating an operation of allocating UL resources by a BS according to an exemplary embodiment of the present invention.

Referring to FIG. 9, in step 902, the BS monitors whether a BR code (for example, a BR RNG code) is received over a designated BR channel (for example, a BR RNGCH). As an example, the BS uses a receive beam having a wider beam width than a data channel, in order to receive the BR code. In step 904, the BS determines whether a BR code is detected from a specific BR channel through the monitoring, and proceeds to step 906 upon detecting the BR code.

In steps 906 and 908, the BS acquires information about at least one of a best BS receive beam appropriate for UL communication with an MS that transmitted the BR code, and a best BS transmit beam appropriate for DL communication with the MS, from at least one of the BR code and the BR channel over which the BR code is received. As an example, in step 906, the BS determines a BS receive beam corresponding to a code set to which the received BR code (i.e., BR RNG code) belongs, as a best BS receive beam of the MS. In step 908, the BS determines a BS transmit beam corresponding to the BR channel over which the BR code is delivered, as a best BS transmit beam of the MS.

In step 910, the BS sends a resource allocation message indicating a UL resource for a BR message that the MS will send, using the best BS transmit beam. In step 912, the BS receives a BR message from the MS using the best BS receive beam.

In step 914, the BS obtains UL resource-related information needed for UL data transmission by the MS, using the BR message, and sends to the MS a UL burst allocation message indicating a UL resource allocated by performing UL resource allocation for UL data transmission by the MS. The BS allocates a UL resource for the MS within an interval where it uses a best BS receive beam in a UL frame, considering the best BS receive beam acquired by receiving the BR code for the UL resource allocated for data transmission, and may send a UL burst allocation message indicating UL resource allocation for the MS using the best BS transmit beam acquired by receiving the BR code. In step 916, the BS receives a UL burst transmitted from the MS through the UL resource allocated by the UL burst allocation message, through the best BS receive beam obtained by receiving the BR code.

Figure 10:
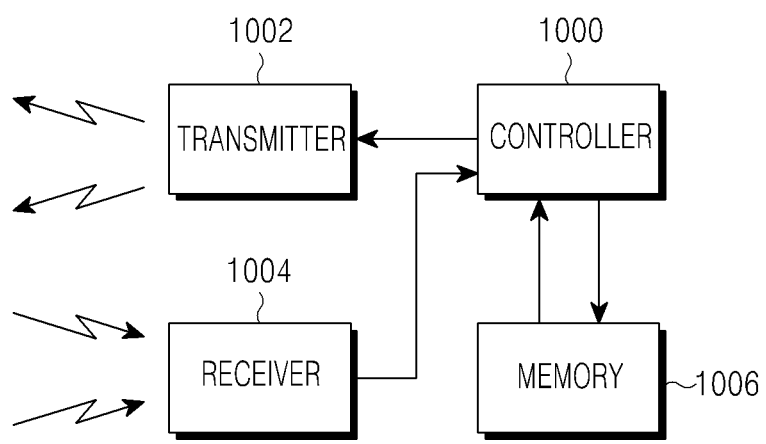
FIG. 10 is a block diagram illustrating a structure of a BS and an MS for performing UL resource allocation according to an exemplary embodiment of the present invention.

FIG. 10 is a block diagram illustrating a structure of a BS and an MS for performing UL resource allocation according to an exemplary embodiment of the present invention.

If the structure of FIG. 10 is applied to an MS, a transmitter 1002 transmits a reference signal through each MS transmit beam while sweeping the MS transmit beams, under control of a controller 1000. The transmitter 1002 transmits, to a BS, a BR code and a BR message, which are provided from the controller 1000 based on best beam information acquired through the UL and DL beam tracking procedures. A receiver 1004 receives a resource allocation message and a UL burst allocation message from the BS under control of the controller 1000, and provides the received messages to the controller 1000. The controller 1000, which controls operations of the transmitter 1002 and the receiver 1004, selects a BR code corresponding to best BS transmit/receive beams, stores UL beam pair information and best BS transmit beam information in a memory 1006, and performs beamforming for UL transmission and DL reception.

If the structure of FIG. 10 is applied to a BS, the receiver 1004 receives reference signals transmitted through MS transmit beams, under control of the controller 1000, and provides the received reference signals to the controller 1000. The transmitter 1002 sends a resource allocation message and a UL burst allocation message provided from the controller 1000, to the MS. The controller 1000, which controls operations of the transmitter 1002 and the receiver 1004, stores best BS transmit/receive beam information received from the MS in the memory 1006, and performs UL scheduling for UL resource allocation.

As is apparent from the foregoing description, according to the disclosed exemplary embodiments of the present invention, UL and DL beam tracking achieved to determine best pairs of transmit beams and receive beams for each MS, and UL resource request/allocation may be efficiently operated in conjunction in a wireless communication system operating based on beamforming In addition, information about transmit/receive beams appropriate for transmission/reception of information and messages exchanged between a BS and an MS is delivered together during UL resource request/allocation, contributing to the maximization of beamforming gain for transmission of messages, and the improvement of transmission/reception performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for requesting uplink resource allocation in a beamforming-based wireless communication system, the method comprising:
   selecting a resource request code and a resource request channel for requesting uplink resource allocation, wherein at least one of the resource request code and the resource request channel is mapped to at least one of a best base station (BS) receive beam and a best BS transmit beam determined for communications with a BS;
   transmitting, by a mobile station (MS), the resource request code to the BS over the resource request channel;
   receiving a resource allocation message indicating an uplink resource for transmission of a resource request message from the BS in response to transmitting the resource request code; and
   transmitting the resource request message based on the resource allocation message.

2. The method of claim 1, wherein the selecting of the resource request code comprises:
   determining a resource request code set corresponding to the best BS receive beam among a plurality of resource request code sets that correspond to a plurality of BS receive beams of the BS, respectively; and
   selecting the resource request code from the determined resource request code set.

3. The method of claim 1, wherein the selecting of the resource request channel comprises:
   selecting a channel region corresponding to the best BS transmit beam from a predetermined resource area including a plurality of channel regions that correspond to a plurality of BS transmit beams of the BS, respectively; and
   determining the resource request channel of the selected channel region.

4. The method of claim 1, wherein the selecting of the resource request code comprises:
   determining a resource request code set corresponding to the best BS transmit beam among a plurality of resource request code sets that correspond to a plurality of BS transmit beams of the BS, respectively; and
   randomly selecting the resource request code from the determined resource request code set.

5. The method of claim 1, wherein the selecting of the resource request channel comprises:
   selecting a channel region corresponding to the best BS receive beam from a predetermined resource area including a plurality of channel regions that correspond to a plurality of BS receive beams of the BS, respectively; and
   determining the resource request channel of the selected channel region.

6. The method of claim 1, wherein the selecting of the resource request code comprises:
   selecting a resource request code of a plurality of resource request codes; and
   encoding information on at least one of the best BS receive beam and the best BS transmit beam within the selected resource request code.

7. The method of claim 1, wherein the resource allocation message is transmitted by the BS using the best BS transmit beam.

8. The method of claim 1, wherein the resource request message is received by the BS using the best BS receive beam.

9. A method for allocating uplink resources in a beamforming-based wireless communication system, the method comprising:

receiving, by a base station (BS) a resource request code from a mobile station (MS) over a resource request channel, wherein at least one of the resource request code and the resource request channel is mapped to at least one of a best BS receive beam and a best BS transmit beam determined for communications with the MS;

determining at least one of the best receive beam and the best BS transmit beam based on at least one of the resource request code and the resource request channel;

transmitting a resource allocation message indicating an uplink resource determined based on the best BS receive beam for transmission of a resource request message; and receiving, from the MS, the resource request message in response to transmitting the resource allocation message.

10. The method of claim 9, wherein the resource request code is selected from a resource request code set corresponding to the best BS receive beam among a plurality of resource request code sets that correspond to a plurality of BS receive beams of the BS, respectively.

11. The method of claim 9, wherein the resource request channel is determined based on a channel region corresponding to the best BS transmit beam selected from a predetermined resource area including a plurality of channel regions that correspond to a plurality of BS transmit beams of the BS, respectively.

12. The method of claim 9, wherein the resource request code is randomly selected from a resource request code set corresponding to the best BS transmit beam among a plurality of resource request code sets that correspond to a plurality of BS transmit beams of the BS, respectively.

13. The method of claim 9, wherein the resource request channel is determined based on a channel region corresponding to the best BS receive beam selected from a predetermined resource area including a plurality of channel regions that correspond to a plurality of BS receive beams of the BS, respectively.

14. The method of claim 9, wherein the resource request code includes encoded information on at least one of the best BS receive beam and the best BS transmit beam.

15. The method of claim 9, wherein the resource allocation message is transmitted by the BS using the best BS transmit beam.

16. The method of claim 9, wherein the resource allocation message is received by the BS using the best BS receive beam.

17. A mobile station (MS) for requesting uplink (UL) resource allocation in a beamforming-based wireless communication system, the MS comprising:

a transceiver; and
a controller for controlling the transceiver, wherein the controller is configured to select a resource request code and a resource request channel for requesting uplink resource allocation, wherein at least one of the resource request code and the resource request channel is mapped to at least one of a best base station (BS) receive beam and a best BS transmit beam determined for communications with a BS, wherein the transceiver is configured to transmit the resource request code to the BS over the resource request channel, wherein the transceiver is configured to receive a resource allocation message indicating an uplink resource for transmission of a resource request message from the BS in response to transmitting the resource request code, and wherein the transceiver is configured to transmit the resource request message based on the resource allocation message.

18. The MS of claim 17, wherein the controller is further configured to determine a resource request code set corresponding to the best BS receive beam among a plurality of resource request code sets that correspond to a plurality of BS receive beams of the BS, respectively, and to select the resource request code from the determined resource request code set.

19. The MS of claim 17, wherein the controller is further configured to select a channel region corresponding to the best BS transmit beam from a predetermined resource area including a plurality of channel regions that correspond to a plurality of BS transmit beams of the BS, respectively, and to determine the resource request channel of the selected channel region.

20. The MS of claim 17, wherein the controller is further configured to determine a resource request code set corresponding to the best BS transmit beam among a plurality of BR resource request code sets that correspond to a plurality of BS transmit beams of the BS, respectively, and to randomly select the resource request code from the determined resource request code set.

21. The MS of claim 17, wherein the controller is further configured to select a channel region corresponding to the best BS receive beam from a predetermined resource area including a plurality of channel regions that correspond to a plurality of BS receive beams of the BS, respectively, and to determine the resource request channel of the selected channel region.

22. The MS of claim 17, wherein the controller is further configured to select a resource request code of a plurality of resource request codes, and to encode information on at least one of the best BS receive beam and the best BS transmit beam within the selected resource request code.

23. The MS of claim 17, wherein resource allocation message is transmitted by the BS using the best BS transmit beam.

24. The MS of claim 17, wherein the resource request message is received by the BS using the best BS receive beam.

25. A base station (BS) for allocating uplink (UL) resources in a beamforming-based wireless communication system, the BS comprising:

a transceiver; and
a controller for controlling the transceiver, wherein the transceiver is configured to receive a resource request code from a mobile station (MS) over a resource request channel, wherein at least one of the resource request code and the resource request channel is mapped to at least one of a best BS receive beam and a best BS transmit beam determined for communications with the MS, wherein the controller is configured to determine at least one of the best BS receive beam and the best BS transmit beam based on at least one of the resource request code and the resource request channel, wherein the transceiver is configured to send a resource allocation message indicating an uplink resource determined based on the best BS receive beam for transmission of a resource request message, and wherein the transceiver is configured to receive, from the MS, the resource request message in response to transmitting the resource allocation message.

26. The BS of claim 25, wherein the resource request code is selected from a resource request code set corresponding to the best BS receive beam among a plurality of resource request code sets that correspond to a plurality of BS receive beams of the BS, respectively.

27. The BS of claim 25, wherein the resource request channel is determined based on a channel region corresponding to the best BS transmit beam selected from a predetermined resource area including a plurality of channel regions that correspond to a plurality of BS transmit beams of the BS, respectively.

28. The BS of claim 25, wherein the resource request code is randomly selected from a resource request code set corresponding to the best BS transmit beam among a plurality of resource request code sets that correspond to a plurality of BS transmit beams of the BS, respectively.

29. The BS of claim 25, wherein the resource request channel is determined based on a channel region corresponding to the best BS receive beam selected from a resource request resource area including a plurality of channel regions that correspond to a plurality of BS receive beams of the BS, respectively.

30. The BS of claim 25, wherein the resource request code includes encoded information on at least one of the best BS receive beam and the best BS transmit beam.

31. The BS of claim 25, wherein the resource allocation message is transmitted by the BS using the best BS transmit beam.

32. The BS of claim 25, wherein the resource request message is received by the BS using the best BS receive beam.

* * * * *